June 24, 1952     A. P. SHEBEL     2,601,227

SAW FILER

Filed Oct. 26, 1948

INVENTOR.
ANTHONY P. SHEBEL
BY
ATTORNEY

Patented June 24, 1952

2,601,227

UNITED STATES PATENT OFFICE 2,601,227

SAW FILER

Anthony P. Shebel, Milwaukee, Wis.

Application October 26, 1948, Serial No. 56,559

8 Claims. (Cl. 76—36)

This invention relates to saw filing devices.

One object of the present invention is to provide a simple and reliable means for positioning guiding and manipulating a file in a manner to produce a saw of high cutting quality.

The cutting quality of a saw for any purpose depends largely upon the shape of the saw teeth and this is determined by the angular position of the file relative to the saw as the filing operation proceeds. For instance, any angular adjustment of the file about its longitudinal axis will modify the shape of a tooth, likewise an angular adjustment of the file relative to the line of saw teeth will affect the shape of the teeth, as will an angular adjustment of the file relative to the plane of the saw blade. A saw tooth shape best suited for any particular purpose can be obtained by a proper selection and combination of the three angular relations just mentioned.

Moreover, uniformity of tooth form is an important factor in obtaining a good cutting action.

The device of the present invention makes it possible to readily position the file so as to conform to any combination of the three angular positions noted and to maintain that position throughout the filing operation.

Other more specific objects and advantages will appear, expressed or implied, from the following description of a saw filing device embodying the invention.

Figure 4:
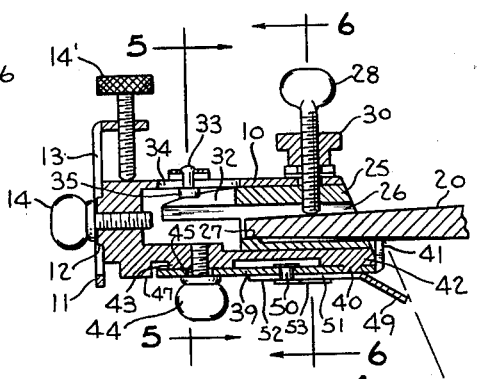
Fig. 4 is a longitudinal sectional view taken along the line 4—4 of Fig. 1 and illustrating on the same scale that portion of the device shown in Fig. 3.
Figures 5, 6, 7:
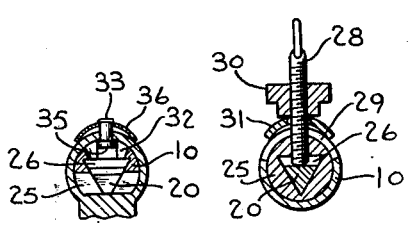

Figs. 5 and 6 are transverse sectional views taken along the lines 5—5 and 6—6, respectively, of Fig. 4.

Fig. 7 is a top plan view of the file holding head shown in Figs. 4, 5 and 6.

Figure 1:
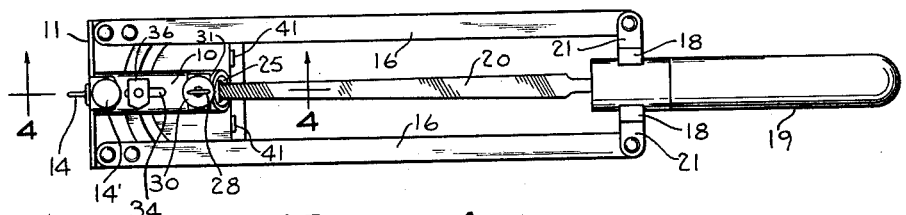
Figure 1 is a top plan view of a saw filing device constructed in accordance with this invention.
Figure 2:
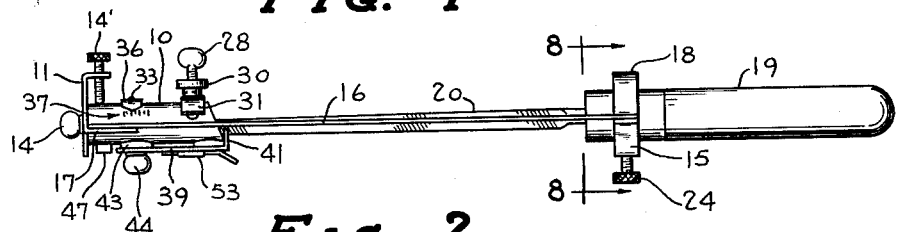
Fig. 2 is a view in side elevation.
Figure 3:
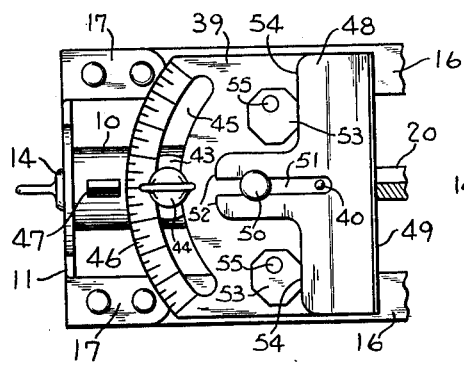
Fig. 3 is a bottom plan view, on a larger scale, of the forward end of the device shown in Figs. 1 and 2.
Figure 8:
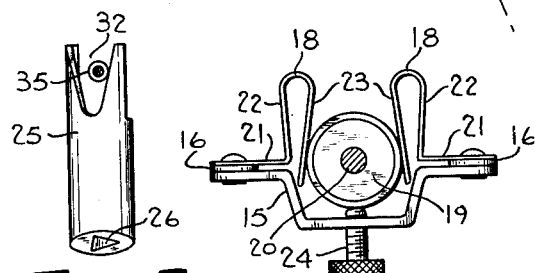

Fig. 8 is a transverse sectional view taken along the line 8—8 of Fig. 2.

Figure 9:
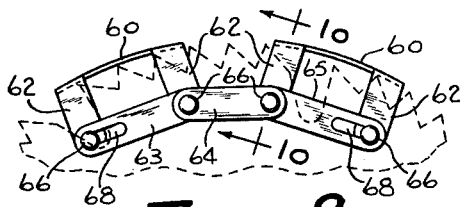
Figure 10:
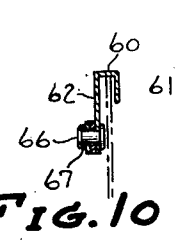

Figs. 9 and 10 are views in side elevation and transverse section, respectively, of an adapter for use with the filing device shown in the other views.

The saw filing device selected for illustration comprises a forward head portion in the form of a substantially cylindrical barrel 10 having an end plate 11 slidably attached to the forward end thereof. The end plate is shown seated against the flat end of the barrel 10 and guided by a rectangular lug 12 formed on the barrel end and closely guided in an upright slot 13 provided in the end plate. A thumb screw 14 threaded into the end of the barrel 10 and bearing against the outer face of the end plate 11 serves to releasably secure the plate in adjusted position on the barrel, and a thrust screw 14' carried by the plate 11 and engageable with the barrel 10 aids in this adjustment.

In this instance the forward end plate 11 is connected to a suitable substantially rigid crosshead 15, at the rear of the device, through a pair of parallel strips 16 of thin steel which, though rather stiff, are sufficiently flexible to yield vertically during the filing operation. The strips 16 are spaced apart at opposite sides of and extend parallel to the barrel 10 and lie in a common plane which extends laterally through the barrel. The strips 16 are shown rigidly secured at their forward ends to rearwardly projecting ears 17 formed on the end plate 11 and also anchored at their rear ends to the ends of the crosshead 15.

The crosshead 15 is shown equipped with a pair of opposed spring clips 18 adapted to receive and grip the handle 19 of a conventional file 20 therebetween. Each clip 18 is of spring metal bent to provide a base portion 21 fixed to an end of the crosshead 15, an upright portion 22 projecting well above the crosshead 15, and a depending finger 23 resiliently urged into rather tight frictional engagement with the file handle 19. A screw 24 in the center of the crosshead 15 and engaging the file handle 19 provides a convenient means for effecting vertical adjustment of the rear end of the file relative to the crosshead 15 and strips 16.

The forward end of the file 20 is supported in a substantially cylindrical head 25 rotatably fitted within the barrel 10 and having a central longitudinal opening 26 into which the file end projects. Although other shapes of files may be used, that shown is a longitudinally tapered triangular file of a well known type and the opening 26 is of triangular form to accommodate the file end. A lug 27 formed within the forward end of the opening 26 provides a slightly elevated seat for the forward end of the file to compensate for the taper thereof and thus position the file so that its longitudinal axis substantially coincides with that of the head 25. When a non-tapered or parallel file is used it is so positioned lengthwise in the head 25 as to extend short of the lug 27 and to thus seat squarely against the bottom of the opening 26. A thumb screw 28 screwed into the head 25 provides a convenient means for releasably clamping the file end therein.

The screw 28 extends through a transverse peripheral slot 29 formed in the barrel 10 and coacts therewith to retain the head 25 and connected file against longitudinal displacement, the screw 28 being adjustable along the slot 29 to rotatably adjust the head 25 and file relative to the barrel 10. A nut 30 on the screw 28 coacts with a spring washer 31, interposed between the nut and barrel 10, to releasably secure the head 25 and file in any selected position of rotative adjustment. In this instance the washer 31 is cambered with a shorter radius of curvature than that of the face of the barrel, so that the center of the washer is normally spaced from the barrel and the outer edges are urged into secure gripping engagement of the barrel under the clamping pressure of the nut 30.

The device shown is equipped with an appropriate camming device as an aid in determining and setting the head 25 and connected file 20 in the desired rotative position, hereinafter referred to as the "pitch" of the file. For this purpose the forward end of the head 25 is provided with a longitudinally extended V-shaped recess 32 whose opposite side walls form oppositely directed helical cam tracks of equal helical angles. A pin 33 projecting vertically through a straight longitudinal slot 34 in the upper side of the barrel 10 carries a suitable cam follower 35 disposed in the recess 32. The pin 33 is carried by the elevated center of a resilient cambered clip 36 whose outer edges frictionally engage the outer surface of the barrel 10 in a manner to yieldably retain the pin 33 and element 35 in any selected position along the slot 34. The clip 36 also coacts with suitable calibrations 37 provided on the exterior of the barrel 10. The arrangement is such that the file may be rotatably adjusted through any predetermined angle in either direction from an intermediate zero or neutral position by first adjusting the clip 36 and pin 33 along the slot 34 to a corresponding position, as indicated by the calibrations 37, and by thereafter rotating the head 25 in one direction or the other until one side or the other of the recess 32 engages the cam follower 35.

The device shown is also equipped with a suitable gauge for accurately positioning the file 20 in the desired angular relation with respect to the line of saw teeth, this relation being hereinafter referred to as the "bevel." In this instance the gauge for this purpose comprises a plate 39 pivotally attached by a stud 40 to the under side of the barrel 10 and provided with a pair of upwardly projecting gauge fingers 41 at the rear edge of the plate. The plate 39 is seated on a pair of flat pads 42 and 43 formed on the under side of the barrel 10, the pivot stud 40 projecting from pad 42 and a clamp screw 44 projecting from the other pad 43. The screw 44 extends through an arcuate slot 45 in the forward end of plate 39, an adjacent calibrated portion 46 on the plate 39 coacting with a suitable lug 47 on the barrel 10 to indicate the angular position of the plate 39 and gauge fingers 41 relative to the axis of the barrel 10 and of the connected file.

As will be hereinafter more fully explained, the device, when in use, is supported by the saw with the strips 16 resting on the tips of the saw teeth and with the gauge fingers 41 bearing against the saw teeth at the beginning of each filing stroke. The angular relation of the plate 39 with its gauge fingers 41 relative to the axis of the barrel 10 and of the file 20 thus determines the angular relation between the saw teeth and the axis of the file prior to each filing stroke of the file.

Provision is also made in the device shown for predetermining the angular relation between the file 20 and the plane of the saw blade or, more particularly, the angular relation between the plane of the saw blade and that plane that contains the axis of the file and extends through the tips of the saw teeth, this angular relation being hereinafter referred to as the "incline." For this purpose an auxiliary plate 48 is adjustably seated on the under side of the plate 39 and provided with a depressed straight edge 49 disposed below and adjacent the gauge fingers 41 and extending laterally in a direction parallel to the latter. This auxiliary plate 48 is retained by suitable means such as a rivet 50 mounted in the plate 39 and extending through a straight slot 51 provided in a forward projection 52 of the auxiliary plate, the head of the rivet 50 being frictionally engaged with the latter to yieldably retain the same in any position of adjustment.

The position of the auxiliary plate 48 is determined by a pair of laterally spaced flat-sided eccentric cams 53 which normally bear against the forward edges 54 of the auxiliary plate. Each of the eccentrics is rotatably adjustable about a stud 55 by which it is mounted on the under side of the plate 39, and for each rotative position of these eccentrics the auxiliary plate 48 and its straight edge 49 assumes a different position relative to the gauge fingers 41 on the plate 39.

The purpose of the straight edge 49 is to bear against the saw blade prior to each filing stroke of the file, and since the gauge fingers 41 are adapted to bear against the saw teeth prior to each filing stroke of the file, they cooperate with the straight edge 49 to determine the "incline" of the file or, in other words, the angular relation between the axis of the file and the plane of the saw blade indicated by the broken line X in Fig. 4. That is to say, by shifting the straight edge 49 toward the right in Fig. 4 the "incline" is increased and by shifting the straight edge in the opposite direction the "incline" is decreased. If desired, several index numbers may be applied adjacent the respective flat sides of each eccentric 53 to correspond to the degree of "incline" obtained when any of said sides is engaged with the auxiliary plate 48.

In performing a saw filing operation the file 20 is reciprocated lengthwise between successive teeth of the saw, each forward stroke constituting a filing stroke and each rearward stroke an idle return stroke, in much the same manner as in ordinary hand filing, the saw blade being clamped or otherwise fixed in an upright position with the line of teeth uppermost and extending substantially horizontally. The device hereinabove described constitutes a carrier for the file and provides a reliable means for effecting the proper angular relation between the file and saw and for insuring that the same relation is maintained at each of the several filing positions along the saw as the filing operation proceeds. During repeated lengthwise reciprocations of the file in each filing position, the side strips 16 of the device function as runners resting and riding upon the tips of the saw teeth, their flexibility permitting the supported file to be pressed into filing engagement with the teeth during each forward or filing stroke thereof.

In preparing for a filing operation the file 20 is first mounted in the device, in the manner hereinabove described, with the forward end thereof clamped in the supporting head 25 and with the handle 19 resiliently gripped between the clips 18. Then by rotative adjustment of the head 25 the file 20 is caused to assume a position corresponding to the desired "pitch," by adjustment of the plate 39 the gauge fingers 41 are caused to assume a position corresponding to the desired "bevel," and by adjustment of the auxiliary plate 48 the straight edge 49 is caused to assume a position corresponding to the desired "incline," all in the manner hereinabove described. The device is then applied to the saw with the runners 16 resting on the tips of the saw teeth and with the file positioned between successive teeth, and the opposite ends of the file 20 are then vertically adjusted by manipulation of the screws 14 and 14' and screw 24 in the manner hereinabove described until the file makes light contact with the adjacent teeth in all lengthwise positions of the file. The apparatus is then ready for filing.

During the filing operation and preliminary to each forward filing stroke, the device is positioned so that both gauge fingers 41 contact the saw, to insure the proper "bevel" position of the file, and so that the straight edge 49 contacts the saw, to insure the proper "incline" position of the file. The proper "pitch" position of the file is assured so long as both runners 16 maintain contact with the tips of the teeth. Then during each filing stroke it is a simple matter to maintain the proper file position, as thus established, since the motion is lengthwise of the file, the runners 16 holding the file against tilting, and the engagement of the file with the saw teeth maintaining the file on its true course. After completing the filing in any one position, the apparatus is transferred to a new position, ordinarily the distance of two teeth along the saw, and the filing operation above described is repeated.

After completing the filing operation operating from one side of the saw, the apparatus is reversed and the operation continued from the other side of the saw. When working from the second side, the "incline" position of the file remains the same, but the "bevel" and the "pitch" of the file is reversed. In the case of the pitch, reversal is accomplished by simply rotating the file 20 and supporting head 25 in a direction to bring the opposite side of the cam recess 32 into contact with the cam follower 35. This of course involves the release and retightening of the nut 30, but the position of the follower 35, pin 33 and clip 36 remain undisturbed, since the helical angles of both sides of the recess 32 are of equal magnitude but opposite in direction, so that for a given position of the follower 35, contact of either with the follower will effect a predetermined "pitch" differing only in direction.

The device hereinabove described may be successfully used for filing practically all varieties of saws, including both straight and circular saws. In some types of saws, however, such as dado, combination and others having raker teeth or teeth widely spaced at intervals, it is desirable to use a special saw attachment which will insure adequate support for the runners 16 of the device. An attachment well adapted to serve this purpose is shown in Figs. 9 and 10. The attachment shown is designed for application to a circular saw. It includes two narrow strips 60 of metal adapted to follow the circular contour of the saw teeth and to rest on the tips thereof. Each strip 60 is provided at one side with a pair of retainer ears 61 adjacent opposite ends thereof and at the other side with a pair of depending arms 62 also arranged adjacent the ends thereof. The lower ends of the four arms 62 are interconnected by three flat links 63, 64 and 65 pivotally connected to each other and to the arms 62 through suitable rivets 66, preferably longitudinally tensioned by suitable means such as spring washers 67, so as to frictionally resist relative adjustment between the links and arms. Each end link 63 and 65 is preferably longitudinally slotted, as at 68, to receive the adjacent rivet 66, so as to permit adjustment of the adjacent arm 62 in a manner to permit bending of either strip 60 to match the contour of the particular saw to which it is applied.

It is of course understood that when applied to a saw in the manner indicated in Fig. 9, the strips 60 bridge any unusual gaps that may exist in the row of saw teeth and thus insure adequate support for the runners 16 of the filing device hereinabove described while the file is acting on teeth exposed between the strips 60.

Various changes may be made in the saw filing device hereinabove specifically described without departing from or sacrificing the advantages of the invention as defined in the appended claims.

I claim:

1. In a saw filing device the combination of a file holder, a pair of laterally spaced substantially parallel runners fixed to said file holder, said runners having substantially co-planar faces adapted to ride on the teeth of a saw to support said holder, a file receiving head rotatably adjustable on said holder between said runners, and means on said rotatably adjustable file receiving head including a pair of oppositely inclined diverging cam surfaces, and a coacting cam follower disposed between said diverging cam surfaces and longitudinally adjustable for determining the extent of rotative adjustment of said head relative to said holder.

2. In a saw filing device the combination of a file holder having a pair of laterally spaced substantially parallel coplanar runners adapted to rest on the toothed edge of a saw during filing of the latter, a file receiving head on said holder for supporting a file lengthwise between said runners, said head including means for effecting predetermined rotative adjustment of the file about the longitudinal axis thereof, angularly adjustable means on said holder for coaction with the saw to determine the angular position of said holder relative to the saw teeth, and slidably extendable adjustable means on said holder for coaction with the saw and said last named angularly adjustable means to determine the angular position of said holder relative to the plane of the saw.

3. In a saw filing device the combination of a file holder having a pair of laterally spaced substantially parallel coplanar runners adapted to rest on the toothed edge of a saw during filing of the latter, a file receiving head on said holder for supporting a file lengthwise between said runners, an angularly adjustable gauge on said holder for coaction with the saw to determine the angular position of said holder relative to the saw teeth, and a slidably adjustable gauge mounted on said angularly adjustable gauge for coaction with the latter and with the saw to determine the angular position of said holder relative to the plane of the saw.

4. In a saw filing device the combination of a pair of end members, a pair of laterally spaced co-planar strips connecting said end members, and means on said end members for coaction with the ends of a file to support the latter between said strips, said strips having faces adapted to rest on the teeth of a saw, and said strips being relatively thin and yieldable to permit depression of the supported file into pressure contact with the saw teeth.

5. In a saw filing device the combination of a pair of end members, a pair of laterally spaced co-planar strips connecting said end members, and means on said end members for coaction with the ends of a file to support the latter between said strips, said means including an element rotatably adjustable to effect rotary adjustment of the supported file about the longitudinal axis thereof, said strips having faces adapted to rest on the teeth of a saw, and said strips being relatively thin and yieldable to permit depression of the supported file into pressure contact with the saw teeth.

6. In a saw filing device the combination of a file holder, a pair of laterally spaced substantially co-planar runners fixed to said holder, a file receiving head rotatably adjustable about an axis extending substantially parallel to said runners, said head having a pair of spaced divergent helical cam surfaces, and a cam follower disposed between said surfaces and adjustable lengthwise thereof for determining the rotative position of said head relative to said holder.

7. In a saw filing device the combination of a pair of end members, a pair of laterally spaced co-planar strips connecting said end members, and means on said end members for coaction with the ends of a file to support the latter between said strips, said means being adjustable to vary the position of said file relative to the plane of said strips, said strips having faces adapted to rest on the teeth of a saw, and said strips being relatively thin and yieldable to permit depression of the file into pressure contact with the saw teeth.

8. In a saw filing device the combination of a pair of end members for receiving the ends of a file to support the latter, a pair of laterally spaced substantially co-planar runners connecting said end members, said runners having bearing faces adapted to rest on the teeth of a saw, said runners being relatively thin and yieldable to permit depression of the file into pressure engagement with the saw teeth, and an angularly adjustable guage on one of said end members for coaction with the saw to determine the angular relation between the file and saw teeth.

ANTHONY P. SHEBEL.

REFERENCES CITED

The following references are of record in the file of this patent:

UNITED STATES PATENTS

| Number | Name | Date |
|---|---|---|
| 801 | Harris | June 21, 1838 |
| 193,209 | Atkins | July 17, 1877 |
| 210,076 | Atkins | Nov. 19, 1878 |
| 593,793 | Vreeland | Nov. 16, 1897 |
| 1,406,924 | Briggs | Feb. 14, 1922 |
| 1,708,388 | House | Apr. 9, 1929 |
| 2,448,702 | Brothers | Sept. 7, 1948 |

FOREIGN PATENTS

| Number | Country | Date |
|---|---|---|
| 36,530 | Sweden | Apr. 15, 1914 |
| 470,959 | Germany | Feb. 1, 1929 |